Sept. 2, 1941.   P. E. HAWKINSON   2,254,526
TIRE TREAD SHAPING AND TRUING MACHINE
Filed Feb. 21, 1940   4 Sheets-Sheet 1
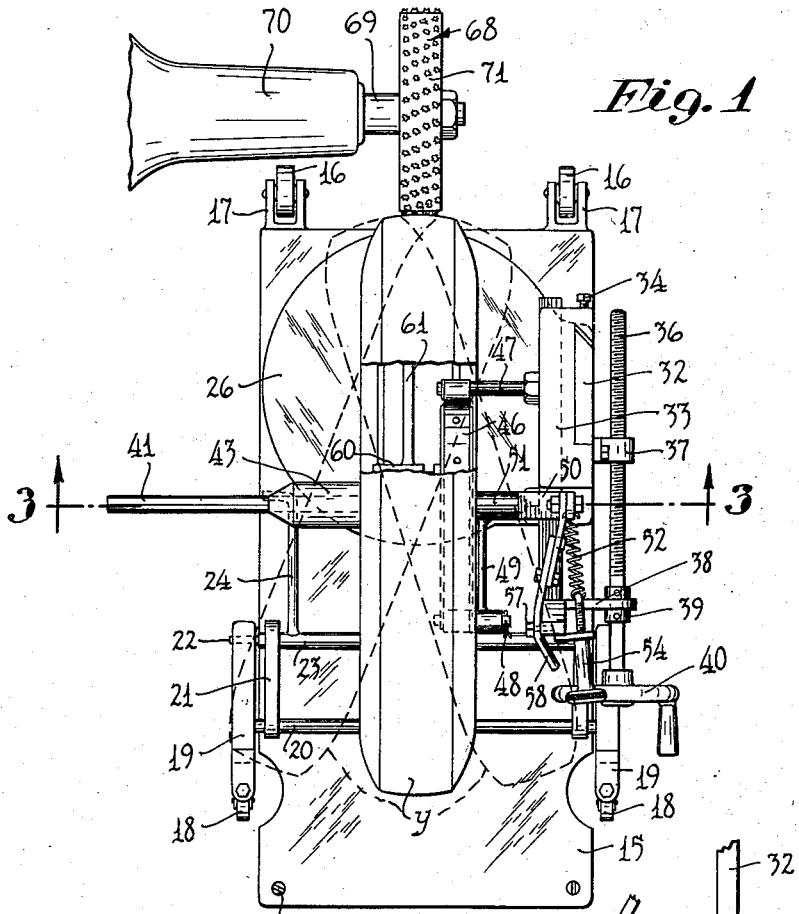
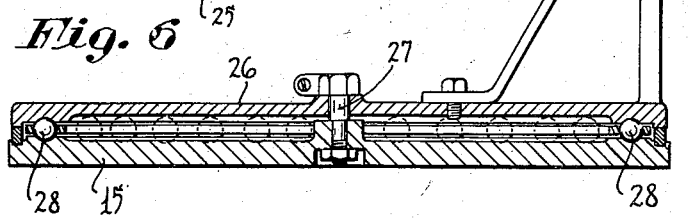
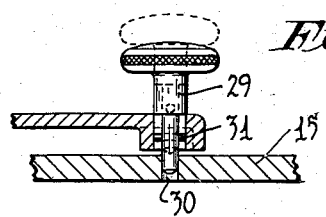
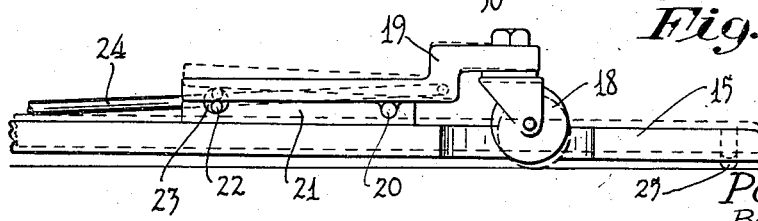
Inventor
Paul E. Hawkinson
By his Attorneys
Merchant & Merchant Sept. 2, 1941.   P. E. HAWKINSON   2,254,526
TIRE TREAD SHAPING AND TRUING MACHINE
Filed Feb. 21, 1940   4 Sheets-Sheet 2
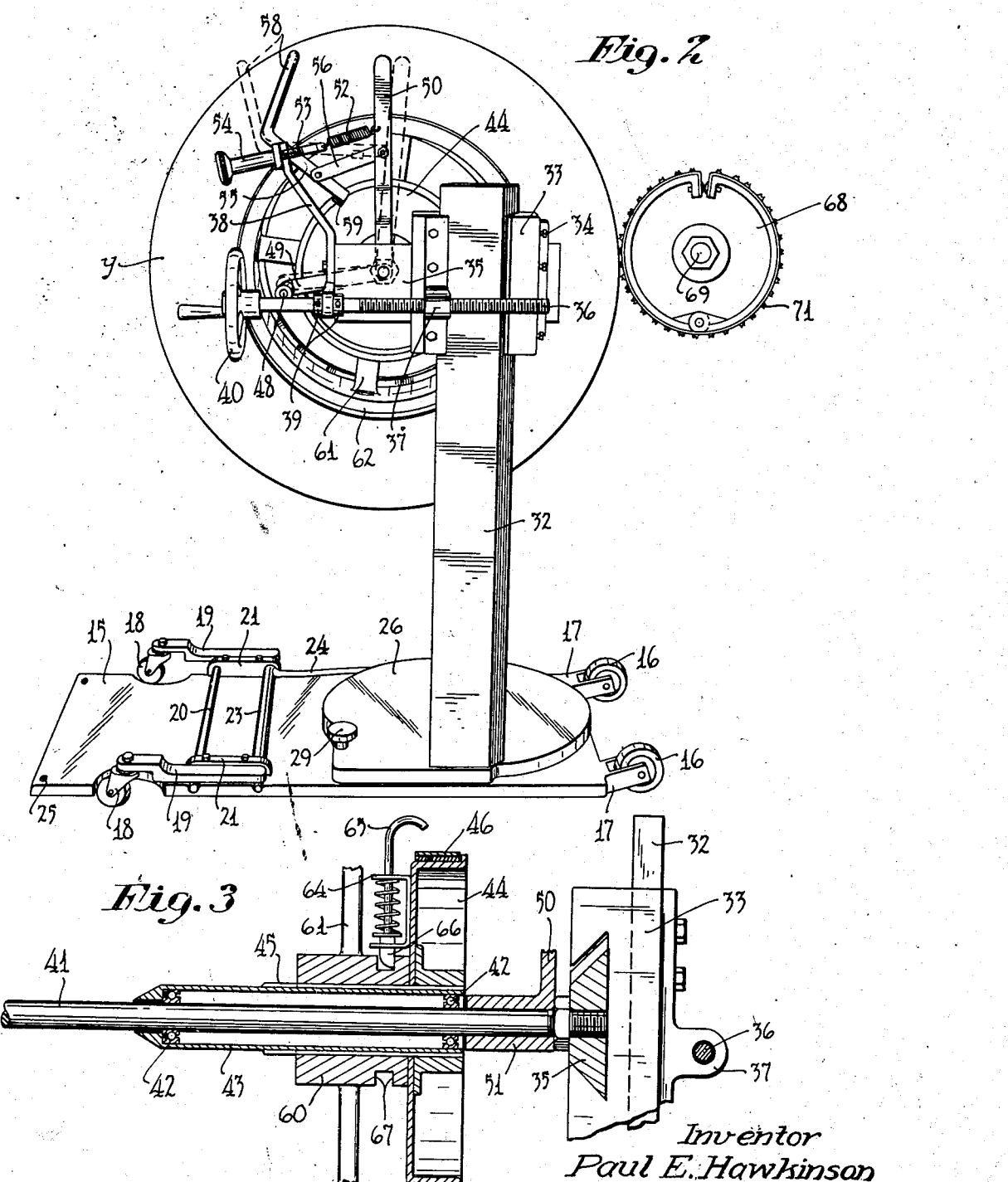
Inventor
Paul E. Hawkinson
By his Attorneys

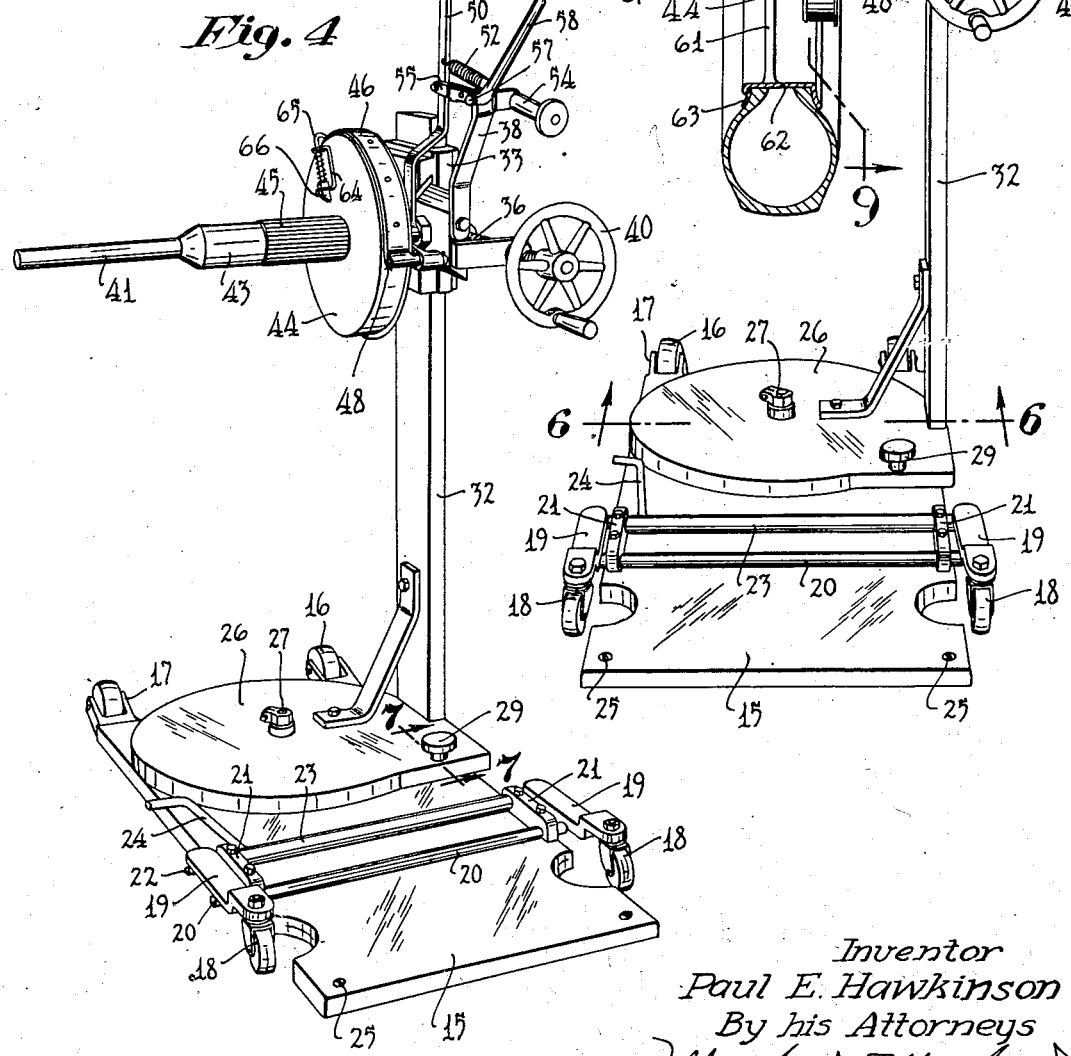

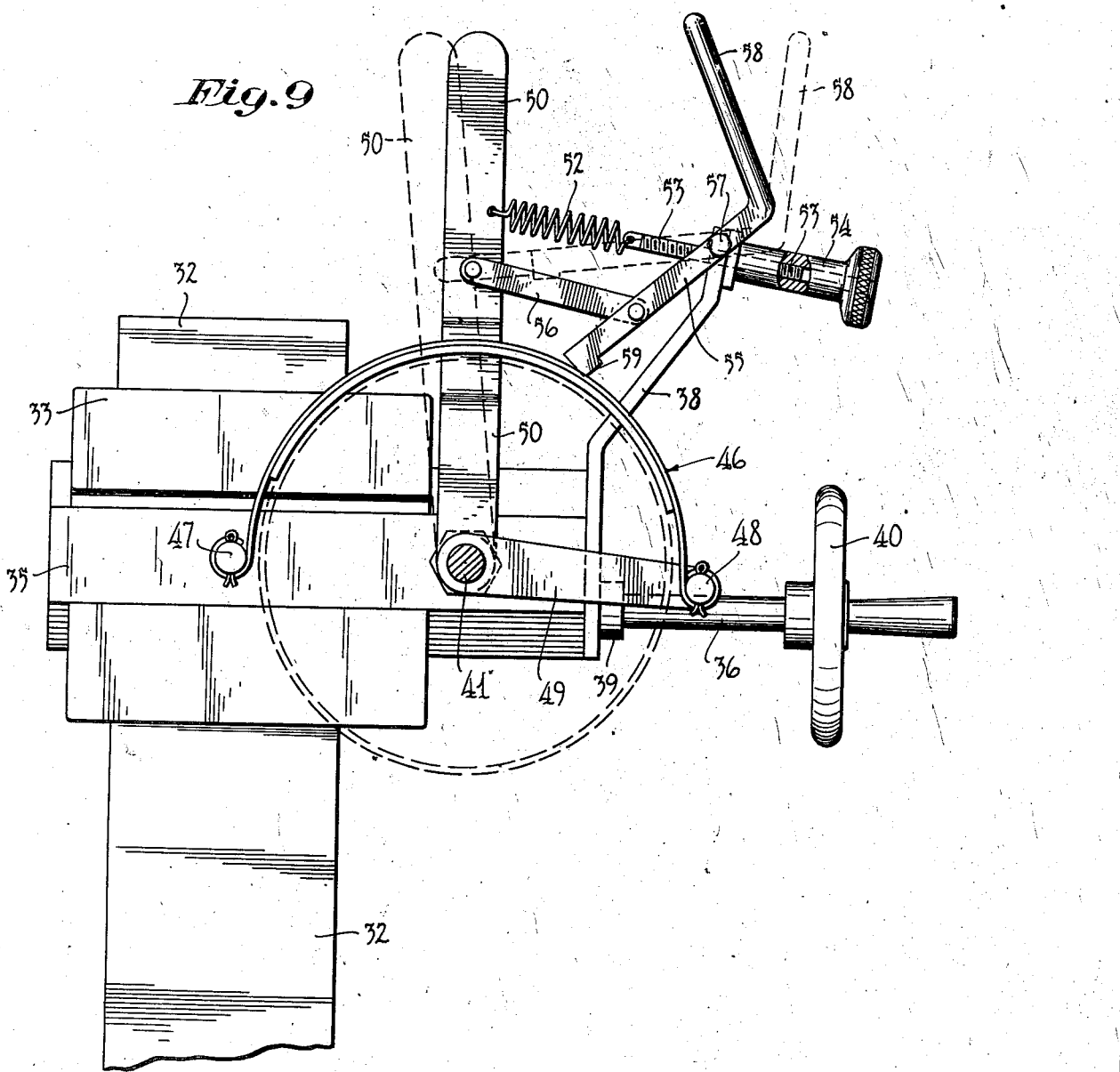

Patented Sept. 2, 1941

2,254,526

UNITED STATES PATENT OFFICE 2,254,526

TIRE TREAD SHAPING AND TRUING MACHINE

Paul E. Hawkinson, Minneapolis, Minn., assignor to Paul E. Hawkinson Company, Minneapolis, Minn., a corporation of Minnesota Application February 21, 1940, Serial No. 320,125

19 Claims. (Cl. 29—76)

My present invention provides an improved machine or machine for shaping and truing up the worn treads of pneumatic tire casings preparatory to application of additional tread material and, generally stated, consists of the novel devices, combinations of devices, and arrangement of parts hereinafter described and defined in the claims.

It is a well-known fact that commercial tire casings under road wear are worn down in a manner that leaves a relatively flat worn ground-engaging surface with annular shoulders at the opposite sides or edges thereof. This worn surface is usually slightly convex transversely of the casing, but is relatively flat as compared with the interior of the casing. Also, this worn tread surface in a worn casing will usually be somewhat irregular and will require truing up or re-forming to some extent for the proper application of retread rubber, and it has been the common practice to true-up, smooth up and condition the worn surface for the application of the retread rubber by what is known as a buffing action usually produced by a buffing wheel having a barbed or more or less abrasive cutting face. In producing the buffing action, the relatively flat but slightly convex worn surface of the tire should be buffed off and trued up on the proper transverse arc or curve and which arc or curve will vary largely according to the transverse cross-section and axial diameter of the casing, and to tire running pressure.

Generally stated, my invention has for its object to provide and does provide a buffing machine or device, by the use of which the above indicated objects or requirements may be rapidly and accurately accomplished.

In the drawings of this application, I have illustrated a commercial machine embodying not only the broad or generic features of the invention, but certain other minor but important features, but it will be understood that this improved machine is capable of various modifications within the scope of the invention herein disclosed and broadly claimed.

Referring to the drawings, wherein like characters indicate like parts throughout the several views:

Fig. 1 is a plan view of the improved machine showing the same in position for presenting a tire casing to a buffing wheel, some parts being broken away;

Fig. 2 is a view in perspective showing the improved buffing machine and the buffing wheel, looking at Fig. 1 from the right toward the left;

Fig. 3 is a vertical section taken approximately on the line 3—3 of Fig. 1, some parts being broken away and some parts being shown in full;

Fig. 4 is a view in perspective showing the buffing machine looking at the same from the rear in respect to Fig. 1;

Fig. 5 is a view in perspective corresponding closely to Fig. 4 but looking at the same on a slightly different angle and showing also a tire casing placed on the dummy wheel applied with the casing in position for buffing action, the said wheel and casing being in transverse diametrical section;

Fig. 6 is a transverse section taken approximately on the line 6—6 of Fig. 5, some parts being broken away;

Fig. 7 is a fragmentary section taken on the line 7—7 of Fig. 4;

Fig. 8 is a side elevation showing the base plate and lifting device of the machine, other parts being removed; and Fig. 9 is a view partly in side elevation with some parts sectioned on the line 9—9 of Fig. 5, various parts of the machine being removed.

The primary support of the machine shown is in the form of a base plate 15 which, at one end, is provided with supporting rollers 16 shown as journaled to lugs 17 rigidly projecting from the base plate. At its other end, the base plate is provided with a lifting device which, as shown, includes castor-acting rollers 18 applied to the ends of lifting bars 19 intermediately pivoted, by a cross-shaft 20 to flanges 21 rigid on the base plate 15. The free inner ends of the lifting bars 19 normally rest upon crank pins 22 of an eccentric shaft 23 journaled in the flanges 21 and provided with an extended arm 24, see particularly Figs. 2 and 8.

When lever 24 is moved, say about 180°, from the position shown in Fig. 2, the wheels 18 will be forced downward, lifting that end of the base plate so that the base plate, and, in fact, the entire machine, may be readily moved from place to place on the rollers 16 and 18. When, however, lever 24 is turned to the position shown by full lines in Fig. 2 and by full lines in Fig. 8, the wheels 18 will be raised and that end of the base plate will then be lowered onto lugs or projections 25 and said lugs will then hold the base plate and the machine against accidental movement on the floor.

Rotatably mounted on the base plate is a turn-table 26. This turn-table is pivotally connected to the base plate by an axial pivot bolt or pintle 27 and to make said table very easy to turn, a ball bearing device 28 is interposed between said turn-table and the base plate, as best shown in Fig. 6. To lock the turn-table in what is treated as normal position, it is shown as provided with a lock bolt 29, see particularly Fig. 7, the depending end of which is engageable with a seat 30 in the base plate. This lock bolt 29 is of a vertically movable type provided with a projecting pin 31 adapting the lock bolt to be lowered into the seat 30 or, by slight turning thereof, to be locked upward in an inoperative position, shown by dotted lines in Fig. 7.

Secured to the turn-table, and rising therefrom on a line eccentric to the axis of said turn-table, is a strong upright column 32 that supports the chief elements of the machine. Mounted on the column 32 is a vertically adjustable head block 33 that is adapted to be vertically adjusted and to be rigidly secured on said column by suitable means, such as a set-screw or screws 34, shown in Fig. 1.

Mounted so as to slide horizontally in the head block 33 is a slide 35 which, as best shown in Fig. 3, has dovetailed engagement with said head block. The horizontal sliding movements of this slide 35 and the set adjustments thereof are arranged to be accomplished by means of a feed-screw 36 that has threaded engagement with a nut-acting flange 37 of said head block and is swivelled to the lower end of an arm-like bracket 38, see particularly Fig. 2, that is bolted or otherwise rigidly secured to the adjacent end of said slide. The feed-screw 36 is thus swivelled to the slide and coupled for sliding movements therewith by means of spaced thrust collars 39 pinned or otherwise rigidly secured to said feed-screw. At one end, the feed-screw 36 is shown as provided with a hand wheel 40 adapting it to be easily manipulated.

Again, by reference particularly to Fig. 3, it will be noted that a non-rotary spindle 41 is rigidly secured to the slide 35 and projects horizontally therefrom. Rotatably mounted on the spindle 41, preferably by means of ball bearing devices 42, is a drum-carrying sleeve 43, to one end of which a brake drum 44 is rigidly secured by suitable means, such as long splines 45 on the exterior of said sleeve. This drum is thus connected for rotation with the sleeve, but is not intended nor is it readily removable from said sleeve. The sleeve 43 is, by the ball bearing devices 42, made very freely rotatable on the spindle 41 but is held against axial movements on said spindle.

For co-operation with the brake drum 44 is a shoe-acting brake band 46 which, at one end, is anchored to the slide 35 by means of an anchoring pin 47, see particularly Fig. 9. The free end of this brake band 46 is, by a pin 48, anchored to an arm 49 which is connected to another arm 50 by means of a hub 51 pivoted on the spindle 41 between the slide 35 and the hub of brake drum 44, see particularly Figs. 3 and 9. The primary brake-actuating arm 50 is connected by a coiled spring 52 to an adjusting screw 53, see particularly Fig. 9, that slides freely through the upper end of arm-like bracket 38 and has threaded engagement with an adjusting sleeve 54 that is free for rotation and reacts against the head or upper end of said bracket 38. At this point, it is only necessary to state that when released, the tension of spring 52 will set the brake band 46 against the brake drum with a frictional force or retarding action depending on the adjustment of the tension of the spring affected by rotation of the nut-acting sleeve 54.

To set the brake band 46 entirely free from contact with the brake drum, there is a releasing or cut-out device shown as made up of pivotally connected toggle levers 55 and 56, the latter of which is pivotally connected to lever 50, and the former of which is pivoted at 57 to the upper end of bracket 38 and is shown as provided with a hand-piece 58 at one end and at its other end with an offset lug 59 that limits the movement of the toggle to the position shown by dotted lines in Fig. 9, and in which dotted line position the toggle will be on a dead center and will hold the retarding brake released.

The tire casing is indicated by the character Y. For holding the casing while it is being "buffed", I provide a sort of a dummy wheel which will hold the tire casing substantially in the same way that it would be held by the rim of a vehicle wheel. This dummy wheel involves a hub 60 with spokes 61, a flanged rim 62, and rim lock ring 63. The hub 60 is internally splined so that it is adapted to be freely slid onto and off from the sleeve 43, and when applied thereto, will be rotated with the brake drum. A simple device is provided for detachably locking the hub 60, and hence, the dummy wheel and tire casing in definite position in respect to the brake drum. The means shown for this purpose involves a U-shaped bracket 64 rigidly secured to the web of the brake drum and a spring-projected latch bolt 65 mounted for movements through the ends of the bracket 64. The head 66 or inner end of lock bolt 65 is preferably beveled and is engageable with an annular groove 67 formed in the hub 60. With this arrangement the hub can be pressed against the brake drum and the spring-pressed latch bolt will automatically engage in the groove 67, thereby locking the hub against axial movements in respect to the drum. The purpose of the annular lock groove 67 is to permit the casing-equipped dummy wheel to be slipped onto the sleeve and locked against axial movements, regardless of the position of rotation of the hub and the parts carried thereby. In Figs. 1 and 2, there is shown a buffing wheel 68 carried by a power-driven spindle 69 journaled in a fixed bearing 70. This buffing wheel 68 is shown as provided with a conventional barbed buffing band 71 of the detachable and replaceable type.

*Use and operation of the machine*

The buffing wheel 68 will be driven in a counter-clockwise direction in respect to Fig. 2 and under the buffing action, the tire casing and its supporting wheel will, by the action of the buffing wheel, be rotated in a clockwise direction in respect to said view. The frictional and cutting action of the buffing wheel will tend to rotate the tire casing at the same peripheral speed as said buffing wheel, but by setting the frictional brake, the rotation of the casing may be retarded to any desired extent.

Obviously the tire casing will be applied to its carrying wheel while the wheel is removed from the spindle and sleeve and thereafter the wheel with the casing will be telescoped on to the splined sleeve and pushed against the brake drum 44 where it will be locked to the sleeve and drum by the latch 66. When the turn-table is then adjusted, as shown by full lines in the drawings, the medial plane of the casing will be in the medial vertical plane of the truck made up of the base plate 15 and its supporting rollers. By manipulation of the feed screw 36, the slide 35 will be horizontally adjusted so that the front face of the tire casing will project forward of the turn-table pivot 27.

It will, of course, be understood that during the buffing action the tire casing will be held in inflated condition under properly air-charged inner tube.

The bearing head 33 should be vertically adjusted so that the axis of the spindle 41 will be slightly below the horizontal plane that intersects the axis of the buffing wheel 68. The slide 35 should then be horizontally adjusted so as to project the front face of the tire casing forward of the vertical axis of the turn-table such a distance that when the turn-table and tire are oscillated, the proper convex curve will be given from dotted line to dotted line position in Fig. 1. When the turn-table is locked with the tire casing in the intermediate position, shown by full lines in Fig. 1, the truck should then be moved forward on its wheels so as to bring the tread surface of the casing substantially into contact with the buffing wheel; and then, by manipulation of the arm 24, the truck wheels 18 will be raised so as to drop the base plate 15 onto the floor and thereby anchor the machine against accidental slipping movements. Thereafter, by manipulation of the feed-screw 36, the slide 35 and the tire casing will be advanced against the buffing wheel.

It will be noted that the spindle 41 projects far beyond the sleeve 43 so that it serves as a convenient handle for oscillating the turn-table and the tire casing back and forth, as indicated by dotted lines in Fig. 1. By thus oscillating the casing and progressively advancing the same against the buffing wheel, the tread surface of the tire may be very quickly and accurately prepared for the application of the tread rubber thereto.

As above indicated, the speed at which the tire casing and its supporting wheel will be rotated by the frictional action of the buffing wheel may be varied simply by adjustment of the tension of the brake setting spring 52 by manipulation of the nut-acting sleeve 54, see particularly Fig. 9. When the brake is released for setting by the toggle lever 55—56, the spring 52 will exert force on the brake band 46 depending on the tension of said spring. When it is desired to lock the brake in released position, it is only necessary to move the toggle-acting link 55—56 to the position indicated by dotted lines in Fig. 9 and in which position the said toggle will be on a dead center and is self-locking in that position. It is important that the brake band, when released, should be completely out of contact with the brake drum and this is accomplished when the toggle is set in dotted line position as above indicated.

Of course, the turn-table must be released from the base plate when the table and tire casing are to be oscillated; and this is quickly accomplished when the lock pin 29 is set in its raised position, as indicated by dotted lines in Fig. 7. The ball bearings make the turn-table very freely movable.

The ball bearings 42 also make the sleeve 43, and hence, the drum 44 and tire-carrying wheel, very freely rotatable on the spindle 41 so that when the brake is released, the device can be used as an efficient tester for balancing the casing and making allowances for balance in the application of tread rubber. For the release of the carrying wheel from the drum, it is only necessary to pull outward on the latch 66.

In accordance with the patent statutes I have disclosed a complete machine or device for the purposes had in view, but it will be understood that the same is capable of various modifications all within the scope of the invention herein disclosed and broadly claimed.

What I claim is:

1. In a machine of the kind described, a support, a spindle mounted thereon, a sleeve rotatable on said spindle, a friction brake operative to retard the rotation of said sleeve, and a tire-casing carrying wheel detachably applied to said sleeve and rotatable with the rotary element of said friction brake.

2. In a machine of the kind described, a support provided with a projecting spindle, a sleeve journaled on said spindle, a brake drum connected to said sleeve for rotation therewith, a frictional brake element acting on said drum to retard the rotary movement of said sleeve, and a tire-casing carrying wheel detachably applicable to said sleeve for rotation with said sleeve and brake drum.

3. In a machine of the kind described, a support, a horizontally movable slide mounted on said support, a spindle projecting from said slide, a sleeve journaled on said spindle, a brake drum connected to said spindle for rotation therewith, a brake shoe-acting element cooperating with said drum to retard the movement of said sleeve, and a tire-casing carrying wheel detachably applicable to said sleeve for rotation with said sleeve and brake drum.

4. The structure defined in claim 1 in which there is an adjustable yielding tension device applied to the brake mechanism for varying the frictional retarding action thereof.

5. The structure defined in claim 3 in further combination with a feed screw connected between said slide and its support when imparting feed movements to said slide and parts carried thereby.

6. The structure defined in claim 1 in further combination with a latch operative to detachably secure the rotary brake element to said wheel.

7. The structure defined in claim 1 in which the hub of said wheel has an annular groove, and the rotary element of said brake has a retractable latch engageable with said hub groove.

8. The structure defined in claim 2 in further combination with a retractable latch carried by said drum and engageable with the hub of said wheel to detachably connect said drum and wheel against axial movements.

9. In a machine of the kind described, an upright support, a bearing head on said support, a slide horizontally movable in said head, a spindle projecting from said slide, a sleeve journaled on said spindle, and a tire carrying wheel rotatable with but slidable axially onto and off from said sleeve.

10. The structure defined in claim 9 in which said bearing head is vertically adjustable on said upright support, and in further combination with a manually operated feed-screw affording a connection between said slide and bearing head.

11. In a machine of the kind described, a base support, a turn-table pivotally mounted on said base support and provided with an upstanding post, a bearing head on said post, a laterally projecting spindle supported by said bearing head, and a tire casing supporting wheel journaled on said spindle for oscillatory movements on a vertical axis that lies in the medial plane of said carrying wheel.

12. The structure defined in claim 11 in which said spindle projects and affords a handle by means of which said turn-table and parts carried thereby may be oscillated.

13. In a machine of the kind described, a base support, a turn-table pivotally mounted on said base support and provided with an upstanding bearing post offset from the axis of the turn-table pivot, a bearing head on the upper portion of said post, a slide horizontally movable in said bearing head and provided with a laterally projecting spindle, a brake drum rotatable on said spindle, a tire casing carrying wheel slidable onto said spindle, means for securing said wheel for rotation with said brake drum, and frictional means co-operating with said brake drum to retard the movement thereof.

14. The structure defined in claim 13 in combination with means for locking the brake-acting element out of action on said drum.

15. The structure defined in claim 11 in which said bearing head is vertically adjustable on said post.

16. The structure defined in claim 13 in which said bearing head is vertically adjustable on said post, and a feed-screw affording a connection between said bearing head and slide for manually imparting feed movements to said slide and parts carried thereby.

17. In a machine of the kind described, a base support, a turn-table pivotally mounted on said base support and provided with an upstanding bearing post offset from the axis of the turn-table pivot, a bearing head on the upper portion of said post, a slide horizontally movable in said bearing head and provided with a laterally projecting spindle, a sleeve rotatable on said spindle, said spindle projecting beyond said sleeve to afford a handle for oscillating said turn-table and parts carried thereby, a brake including a drum mounted for rotation with said sleeve, a tire casing carrying wheel detachably mounted on said sleeve for rotation therewith and with the brake drum, and means for imparting feed movements to said slide.

18. The structure defined in claim 17 in further combination with a latch for detachably securing said wheel to said brake drum against accidental axial movements.

19. In a machine of the kind described, a base mounted to oscillate on a vertical axis and having an upright member offset from said axis, a head vertically adjustable on said upright member, a slide horizontally movable on said head, and means on said head for rotatively supporting a tire casing with its medial plane positioned to include the pivotal axis of said base.

PAUL E. HAWKINSON.